United States Patent Office 3,547,580
Patented Dec. 15, 1970

3,547,580
PEROXYDIPHOSPHATE COMPOUNDS
Bernard Cohen, Trenton, N.J., assignor to FMC Corporation, New York, N.Y., a corporation of Delaware
No Drawing. Filed Aug. 28, 1968, Ser. No. 755,811
Int. Cl. C01b 15/16
U.S. Cl. 23—106                                4 Claims

ABSTRACT OF THE DISCLOSURE

A new class of peroxydiphosphate compounds containing mixed cations has been found which is defined by the formula $M_mN_{4-(m+n)}H_nP_2O_8$ where M and N are each selected from the class of cations of $Na^+$, $K^+$, $Li^+$ or $NH_4^+$, but where M is not the same cation as N, and where $m$ is an integer of 1 to 3 and $n$ is an integer of 0 or 2.

BACKGROUND OF THE INVENTION

Field of the invention

This invention relates to a new class of peroxydiphosphate compounds containing mixed cations.

Description of the prior art

Certain peroxydiphosphate salts are known in the art. These include, among others, $K_4P_2O_8$, $Li_4P_2O_8 \cdot 4H_2O$, $Na_4P_2O_8 \cdot (H_2O_2)_n$ where $n$ may vary from 0 to 20, and $(NH_4)_4P_2O_8 \cdot 2H_2O$. A known method of producing peroxydiphosphate salts, such as tetrapotassium peroxydiphosphate, is reported by F. Fichter and E. Gutzwiller in Helv. Chim. Acta 11, 323–337 (1928). These salts have been found effective as selective oxidizing agents in certain applications, such as hair bleaching, where they are used as activators. While these salts are effective in such applications, many of these salts do not have desirable physical properties which allow them to be easily manufactured, packaged or handled. For example, salts such as the tetrapotassium peroxydiphosphates do not form into clean-cut, easily processed crystals. Instead, they are in the form of a fine powder which is difficult to crystallize, wash and to carry out other necessary manufacturing steps. In particular, the recovery and drying of this salt from solutions requires a difficult centrifuging and separation step. Other such salts, such as the tetralithium peroxydiphosphate, have extremely low solubility which restricts the amount of the salt which can be dissolved in making up aqueous solutions thereof, and ultimately limits the practical amount of salt which can be used.

As a result, there is a need for peroxydiphosphate salts which do not have these undesirable physical properties but which retain the oxidative properties of peroxydiphosphates.

SUMMARY OF THE INVENTION

I have now prepared a novel class of peroxydiphosphate salts which can be identified by the formula $$M_mN_{4-(m+n)}H_nP_2O_8$$

wherein M and N are cations which may be either sodium, potassium, lithium or ammonium cations but where M is a different cation from N, where $m$ is an integer of 1 to 3, and $n$ is an integer of 0 or 2.

DESCRIPTION OF THE INVENTION AND THE PREFERRED EMBODIMENTS

In the practice of the invention, the present class of peroxydiphosphate salts are prepared from an alkali metal peroxydiphosphate containing one cation, preferably tetrapotassium peroxydiphosphate. Tetrapotassium peroxydiphosphate may be produced by the method reported by F. Fichter and E. Gutzwiller, Helv. Chim. Acta 11, 323–337 (1928). Another method which may be utilized to produce tetrapotassium peroxydiphosphate is the electrolysis of an anolyte containing an aqueous mixture of potassium, phosphate and fluoride ions separated by a diaphragm means from a catholyte containing an aqueous mixture of phosphate ions. This latter preparation is reported in a copending application, Ser. No. 688,525, filed Dec. 6, 1967 in the name of Paul R. Mucenieks.

In preparing the present class of peroxydiphosphate salts, tetrapotassium peroxydiphosphate is dissolved in a solvent such as water. A stoichiometric amount of the desired cation (or hydrogen ion) which is to replace all or part of the potassium ion in the peroxydiphosphate salt, e.g., sodium, is then added to the solution. The desired cation (or hydrogen ion) is added in the form of a compound which has an anion that forms an insoluble precipitate with the potassium cation of the starting peroxydiphosphate. A typical illustration of this reaction is shown in the following equation:

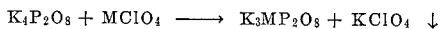

where M is $Na^+$, $NH_4^+$ or $Li^+$.

Thereafter, the mixed $K_3MP_2O_8$ salt is precipitated from solution and recovered by conventional means. These would include partially evaporating the solvent or adding a "nonsolvent" liquid to the solution in which the desired, mixed peroxydiphosphate salt is insoluble. In either case, the desired, mixed peroxydiphosphate salt precipitates from solution and can be separated and recovered. Many of these salts precipitate as hydrates and can be recovered in their anhydrous form by heating them under vacuum to remove the hydrated water.

To illustrate this procedure, if the desired salt is a mixed potassium-sodium peroxydiphosphate, sodium is added to an aqueous solution of tetrapotassium peroxydiphosphate as sodium perchlorate. Upon adding the sodium perchlorate to the tetra potassium peroxydiphosphate, a stoichiometric amount of potassium, equivalent to the added sodium cation, precipitates as potassium perchlorate and can be separated from the remaining solution; this latter solution would contain the desired, mixed potassium-sodium peroxydiphosphate dissolved therein. If hydrogen also is to be substituted in part for potassium, hydrogen can be added as perchloric acid in a second step. Upon addition of the acid, a stoichiometric amount of potassium, equivalent to the added perchloric acid, precipitates as potassium perchlorate. The resulting, mixed salt solution is then treated to precipitate the mixed salt, e.g, potassium-sodium peroxydiphosphate (or potassium-sodium hydrogen peroxydiphosphate, if hydrogen was added) by adding a nonsolvent thereto. If the entire reaction is carried out using water as the solvent, the nonsolvent which is added thereto may be a low molecular weight aliphatic alcohol, e.g., ethanol or methanol, and the desired sodium-potassium peroxydiphosphate salt precipitates from the solution. In certain instances, particularly in the formation of the specific salt $K_2Na_2P_2O_8$, the resulting aqueous solution must be partially evaporated to properly precipitate the mixed peroxydiphosphate salt.

When more than one cation is being substituted, as when both sodium and hydrogen are being used to replace some of the potassium ions in tetrapotassium peroxydiphosphate, the process is repeated using first one perchlorate salt, such as sodium perchlorate, followed by perchloric acid in order to introduce the desired hydrogen ion in the resulting, mixed peroxydiphosphate salt. The order of replacement is not critical.

In the above description of the invention, the cation substituent that replaces a portion of the potassium ion of tetrapotassium peroxydiphosphate, has been introduced in the form of its perchlorate salt, or, as in the case of hydrogen substitution, as perchloric acid. However, other suitable anions which are equivalent to perchlorate salts in this type of preparation include the silicate, fluoroborate or persulfate salts. These compounds also form insoluble precipitates with potassium cations. Among the salts that have been found effective are $(NH_4)_2S_2O_8$, $Na_2S_2O_8$, $NaBF_4$, $HBF_4$ and $Na_4SiO_4$.

Another method for preparing the instant class of peroxyphosphate salts can be achieved using tetrapotassium peroxyphosphate as the initial reactant. In this process the tetrapotassium peroxyphosphate is first dissolved in water. A compound is then added to the solution whose cation, e.g., sodium, is to replace at least some of the potassium ions in solution. The anion of the above compound is chosen so that it forms a salt with potassium which is more soluble than the desired peroxydiphosphate salt containing a plurality of cations. This latter peroxydiphosphate salt is then precipitated from solution by evaporation of a portion of the solvent, leaving in solution the more soluble potassium salt formed by potassium and the anion of the above compound.

In a typical example of this technique, tetrapotassium peroxydiphosphate is first dissolved in water, and sodium chloride is added to the solution. The sodium chloride is added in amounts to replace a portion of the potassium ion with stoichiometric amounts of sodium in order to obtain a mixed sodium-potassium peroxydiphosphate salt. Upon addition of the sodium chloride, the following reaction occurs:

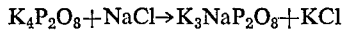

$K_4P_2O_8 + NaCl \rightarrow K_3NaP_2O_8 + KCl$

The potassium chloride which is formed in solution is more soluble than the potassium-sodium peroxydiphosphate salt, and therefore the latter precipitates by crystallization from a saturated solution of the components, leaving the potassium chloride in solution. In order to promote this selective crystallization, the solution may be partially evaporated in order to saturate it and permit the mixed sodium-potassium peroxydiphosphate salt to crystallize from the solution.

The mixed peroxydiphosphate salts of the present invention can be purified readily by dissolving them in water and reprecipitating them by gradually adding a nonsolvent to the water solution. Suitable nonsolvents include low molecular weight alcohols, such as ethyl alcohol, methanol, and the like. The only exception to this technique is the production of $Na_2K_2P_2O_8$ which requires evaporation of a portion of the water in order to precipitate out this mixed peroxydiphosphate salt.

The instant, mixed cation peroxydiphosphate compounds have been found to be useful in modifying native (unmodified) starches. In this application an aqueous slurry of native starch is prepared. The native starch may be any raw starch commonly derived from corn, potatoes, tapioca, rice, wheat, sorghum, and the like. Normally, pearl cornstarch is the preferred form of raw starch because it is cheap and readily available in commercial quantities.

To the resulting aqueous starch slurry is then added one of the instant peroxydiphosphate salts in an amount sufficient to yield an active oxygen concentration of at least about 0.005 to 0.200%, based on the weight of the starch. The resulting mixture of starch, water and the added peroxydiphosphate salt is then thoroughly mixed and heated to a temperature below the gelatinization temperature of the starch utilized. The oxidative modification of the starch takes place during this heating stage.

The resultant, modified starch, upon being heated in an aqueous solution at temperatures above the gelatinization temperature, i.e., normally above about 175° F., forms a starch paste having a much lower viscosity than would be obtained from unmodified, raw starch. Typical peroxydiphosphate salts produced in accordance with the present invention include tripotassium monosodium peroxydiphosphate
  ($K_3NaP_2O_8$),
dipotassium disodium peroxydiphosphate
  ($K_2Na_2P_2O_8 \cdot 2H_2O$),
monopotassium trisodium peroxydiphosphate
  ($KNa_3P_2O_8$),
monoammonium tripotassium peroxydiphosphate
  ($K_3(NH_4)P_2O_8$),
diammonium dipotassium peroxydiphosphate
  ($K_2(NH_4)_2P_2O_8 \cdot 2H_2O$),
triammonium monopotassium peroxydiphosphate
  ($K(NH_4)_3P_2O_8 \cdot 2H_2O$),
monoammonium trisodium peroxydiphosphate
  ($NH_4Na_3P_2O_8$),
diammonium disodium peroxydiphosphate
  ($(NH_4)_2Na_2P_2O_8$),
triammonium monosodium peroxydiphosphate
  ($(NH_4)_3NaP_2O_8$),
monopotassium monosodium dihydrogen peroxydiphosphate ($KNaH_2P_2O_8$),
monoammonium monopotassium dihydrogen peroxydiphosphate ($K(NH_4)H_2P_2O_8$),
monoammonium monosodium dihydrogen peroxydiphosphate ($Na(NH_4)H_2P_2O_8$),
trilithium monopotassium peroxydiphosphate
  ($Li_3KP_2O_8$),
dilithium dipotassium peroxydiphosphate
  ($Li_2K_2P_2O_8$),
monolithium tripotassium peroxydiphosphate
  ($LiK_3P_2O_8$),
trilithium monosodium peroxydiphosphate
  ($Li_3NaP_2O_8$),
dilithium disodium peroxydiphosphate ($Li_2Na_2P_2O_8$),
monolithium trisodium peroxydiphosphate
  ($LiNa_3P_2O_8$),
triammonium monolithium peroxydiphosphate
  ($(NH_4)_3LiP_2O_8$),
diammonium dilithium peroxydiphosphate
  ($(NH_4)_2Li_2P_2O_8$),
monodiammonium trilithium peroxydiphosphate
  ($(NH_4)Li_3P_2O_8$),
monolithium monosodium dihydrogen peroxydiphosphate ($LiNaH_2P_2O_8$),
monoammonium monolithium dihydrogen peroxydiphosphate ($(NH_4)LiH_2P_2O_8$),
monolithium monopotassium dihydrogen peroxydiphosphate ($LiKH_2P_2O_8$).

The following examples are given to illustrate the present invention and are not deemed to be limiting thereof.

EXAMPLE 1

A solution was made up containing 34.7 g. of tetrapotassium peroxydiphosphate, $K_4P_2O_8$, dissolved in 100 ml. of water. The tetrapotassium peroxydiphosphate was produced by electrolysis of an anolyte containing an aqueous mixture of potassium, phosphate and fluoride ions and a catholyte containing an aqueous mixture of phosphate ions in which the anolyte and catholyte were separated by diaphragm means. This tetrapotassium peroxydiphosphate synthesis is reported in detail in a copending application, Ser. No. 688,525, filed Dec. 6, 1968 in the name of Paul R. Mucenieks.

Thereafter, a second solution was made up containing 23.5 g. of ammonium perchlorate, $NH_4ClO_4$, dissolved in 125 ml. of water. The two solutions were cooled and then mixed together in an ice bath at 0° C. and allowed to stand for about 15 minutes. A precipitate of potassium perchlorate, $KClO_4$, weighing 28.4 g., was separated from the resulting supernatant liquid. The supernatant liquid was then added to 500 ml. of ethanol in an ice bath. A precipitate was separated, weighing 31.5 g., which was identified as diammonium dipotassium peroxydiphosphate, $K_2(NH_4)_2P_2O_8$, by both chemical analysis and by X-ray analysis. The assay of this peroxydiphosphate salt was 98.7%.

EXAMPLE 2

A solution was made up containing 34.7 g. of tetrapotassium peroxydiphosphate, $K_4P_2O_8$, dissolved in 100 ml. of water. Thereafter, a second solution was made up containing 35.3 g. of ammonium perchlorate, $NH_4ClO_4$, dissolved in 200 ml. of water. The two solutions were cooled and then mixed together in an ice bath at 0° C. and allowed to stand for about 15 minutes. A precipitate of potassium perchlorate, $KClO_4$, weighing 40.5 g. was separated from the resulting supernatant liquid. The supernatant liquid was then added to 500 ml. of methanol in an ice bath. A precipitate was separated, weighing 29.5 g., which was identified as triammonium monopotassium peroxydiphosphate dihydrate, $K(NH_4)_3P_2O_8 \cdot 2H_2O$, by both chemical analysis and by X-ray analysis. The assay of this peroxydiphosphate salt was 97.5%.

EXAMPLE 3

A solution was made up containing 34.7 g. of tetrapotassium peroxydiphosphate, $K_4P_2O_8$, dissolved in 100 ml. of water. Thereafter, a second solution was made up containing 14 g. of sodium perchlorate monohydrate, $NaClO_4 \cdot H_2O$, dissolved in 25 ml. of water. The two solutions were cooled and then mixed together in an ice bath at 0° C. and allowed to stand for about 15 minutes. A precipitate of potassium perchlorate, $KClO_4$, weighing 13.2 g., was separated from the resulting supernatant liquid. The supernatant liquid was then added to 500 ml. of methanol in an ice bath. A precipitate was separated, weighing 30.0 g., which was identified as tripotassium monosodium peroxydiphosphate, $K_3NaP_2O_8$, by both chemical analysis and by X-ray analysis. The assay of this peroxydiphosphate salt was 96.6%.

EXAMPLE 4

A solution was made up containing 34.7 g. of tetrapotassium peroxydiphosphate, $K_4P_2O_8$, dissolved in 100 ml. of water. Thereafter, a second solution was made up containing 28.1 g. of sodium perchlorate monohydrate, $NaClO_4 \cdot H_2O$, dissolved in 25 ml. of water. The two solutions were cooled and then mixed together in an ice bath at 0° C. and allowed to stand for about 15 minutes. A precipitate of potassium perchlorate, $KClO_4$, weighing 26.7 g. was separated from the resulting supernatant liquid. The supernatant liquid was then added to 500 ml. of methanol in an ice bath. The resulting, cooled solution separated into two layers, an upper aqueous layer and a lower, viscous, dense, liquid layer. The lower, viscous layer was separated from the upper, aqueous layer and was air dried. A crystalline compound was recovered, weighing 27.5 g., which was identified as disodium dipotassium peroxydiphosphate dihydrate, $$Na_2K_2P_2O_8 \cdot 2H_2O$$

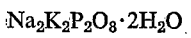

by both chemical analysis and X-ray analysis. The assay of this peroxydiphosphate salt was 96.1%.

EXAMPLE 5

A solution was made up containing 34.7 g. of tetrapotassium peroxydiphosphate, $K_4P_2O_8$, dissolved in 100 ml. of water. Thereafter, a second solution was made up containing 42.2 g. of sodium perchlorate monohydrate, $NaClO_4 \cdot H_2O$, dissolved in 50 ml. of water. The two solutions were cooled and then mixed together in an ice bath at 0° C. and allowed to stand for about 15 minutes. A precipitate of essentially potassium perchlorate, $KClO_4$, weighing 40.5 g., was separated from the resulting supernatant liquid. The supernatant liquid was then added to 500 ml. of methanol in an ice bath. A precipitate was separated, weighing 26.7 g., which was identified as monopotassium trisodium peroxydiphosphate, $KNa_3P_2O_8$, by both chemical analysis and by X-ray analysis. The assay of this peroxydiphosphate salt was 95.6%.

EXAMPLE 6

A solution was made up containing 34.7 g. of tetrapotassium peroxydiphosphate, $K_4P_2O_8$, dissolved in 100 ml. of water. Thereafter, a second solution was made up containing 21.2 g. of lithium perchlorate, $LiClO_4$, dissolved in 50 ml. of water. The two solutions were cooled and then mixed together in an ice bath at 0° C. and allowed to stand for about 15 minutes. A precipitate of potassium perchlorate, $KClO_4$, weighing 27.5 g., was separated from the resulting supernatant liquid. The supernatant liquid was then added to 500 ml. of methanol in an ice bath. A precipitate was separated, weighing 36.5 g., which was identified as dipotassium dilithium peroxydiphosphate hexahydrate, $K_2Li_2P_2O_8 \cdot 6H_2O$, by both chemical analysis and by X-ray analysis. The assay of this peroxydiphosphate salt was 100%.

EXAMPLE 7

A solution was made up containing 34.7 g. of tetrapotassium peroxydiphosphate, $K_4P_2O_8$, dissolved in 100 ml. of water. The solution was cooled in an ice bath at 0° C. and 28.6 g. of perchloric acid, $HClO_4$, having a concentration by weight of 70%, was added to the above solution in the ice bath. The mixture was allowed to stand for about 15 minutes. A precipitate of essentially potassium perchlorate, $KClO_4$, weighing 28 g., was separated from the resulting supernatant liquid. Thereafter, a second solution was made up containing 14.0 g. of sodium perchlorate monohydrate, $NaClO_4 \cdot H_2O$ dissolved in 25 ml. of water. This second solution was added, with mixing, to the above supernatant liquid in an ice bath at 0° C. A second precipitate of essentially potassium perchlorate, $KClO_4$, weighing 16 g., was separated from the resulting mixture. The supernatant liquid from the second precipitate was then added to 500 ml. of ethanol in an ice bath. A precipitate was separated, weighing 20.5 g., which was identified as monopotassium monosodium dihydrogen peroxydiphosphate dihydrate, $$KNaH_2P_2O_8 \cdot 2H_2O$$

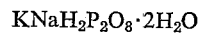

by both chemical analysis and by X-ray analysis. The assay of this peroxydiphosphate salt was 99.1%.

EXAMPLE 8

A solution was made up containing 34.7 g. of tetrapotassium peroxydiphosphate, $K_4P_2O_8$, dissolved in 100 ml. of water. The solution was cooled in an ice bath at 0° C.. and there was added 28.6 g. of perchloric acid, $HClO_4$, having a concentration by weight of 70%. The resulting mixture was cooled in an ice bath at 0° C. and allowed to stand for about 15 minutes under constant agitation. A precipitate of potassium perchlorate, $KClO_4$, weighing 27.5 g., was separated from the resulting supernatant liquid. Thereafter, a second solution was made up containing 11.8 g. of ammonium perchlorate, $NH_4ClO_4$, dissolved in 100 ml. of water. The supernatant liquid and the second solution were cooled and then mixed together in an ice bath at 0° C. and allowed to stand for about 15 minutes. A second precipitate of essentially potassium perchlorate, $KClO_4$, weighing 16 g., was separated from the resulting mixture. The supernatant liquid from the second precipitate was then added to 500 ml. of methanol in an ice bath. A precipitate was separated, weighing 19.0 g., which was identified as monopotassium monoammonium dihydrogen peroxydiphosphate hexahydrate, $$K(NH_4)H_2P_2O_8 \cdot 6H_2O$$

by both chemical analysis and by X-ray analysis. The assay of this peroxydiphosphate salt was 95.8%.

EXAMPLE 9

A solution was made up containing 34.7 g. of tetrapotassium peroxydiphosphate, $K_4P_2O_8$, dissolved in 100 ml. of water. Thereafter, a second solution was made up containing 28.1 g. of sodium perchlorate monohydrate, $NaClO_4 \cdot H_2O$, dissolved in 25 ml. of water. The two solutions were cooled and then mixed together in an ice bath at 0° C. and allowed to stand for about 15 minutes. A precipitate of essentially potassium perchlorate, $KClO_4$, weighing 28.0 g. was separated from the resulting supernatant liquid. Thereafter, a solution was made up containing 23.6 g. $NH_4ClO_4$ in 200 ml. water. This solution was added to the supernatant liquid, then mixed together in an ice bath at 0° C. and allowed to stand for about 15 minutes. A second precipitate of potassium perchlorate, $KClO_4$, weighing 26.0 g. was separated from the resulting supernatant liquid. The supernatant liquid from the second precipitate was then added to 700 ml. of methanol in an ice bath. A precipitate was separated and weighed 26.3 g. after drying at 100° C. for 24 hours. The material was identified as diammonium disodium peroxydiphosphate, by both chemical analysis and by X-ray analysis. The assay of this peroxydiphosphate salt was 96.2%.

EXAMPLE 10

To illustrate the utility of the present class of compounds for oxidation modification of raw starch, the following tests were performed.

An 11.1% (dry starch basis) solids slurry was prepared by adding 50 g. (dry starch basis) of unmodified pearl cornstarch to 400 g. of water. The resulting pH of the slurry was 5.30. To the slurry was then added 1.224 g. of dipotassium diammonium peroxydiphosphate which provided 0.13% active oxygen based on the dry starch content. The starch slurry was then placed in a water bath at ambient temperature, and the slurry was constantly stirred while the temperature in the water bath was slowly increased. The temperature of the starch slurry increased until it reached a temperature range of from about 160–170° F. during which the starch modification occurred over a period of about 20 minutes. The temperature of the starch slurry was allowed to rise to 200° F. and was held at this temperature for 30 minutes. Thereafter, the thoroughly cooked and pasted starch was removed from the water bath, the viscosity measurements were taken as the paste temperature dropped towards ambient temperature. Viscosity measurements were taken with a Brookfield Model RVT Viscometer using a number 4 spindle at 20 r.p.m. Viscosity readings in centipoise were thus obtained and are reported below:

|  | Cps. |
|---|---|
| 180° C. | 800 |
| 160° C. | 900 |
| 140° C. | 1100 |
| 120° C. | 1600 |

By comparison, unmodified cornstarch at viscosity readings:

|  | Cps. |
|---|---|
| 160° F. | 165,000 |
| 140° F. | 245,000 |
| 120° F. | 286,000 |

EXAMPLE 11

The procedure of Example 10 was repeated except that an equivalent amount of dipotassium disodium peroxydiphosphate was employed in place of the dipotassium diammonium peroxydiphosphate to yield an active oxygen concentration of 0.13% based on the dry weight of the starch employed. The viscosities of the resulting paste mixture were found to be substantially the same as with the dipotassium diammonium peroxydiphosphate.

Pursuant to the requirements of the Patent Statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. Peroxydiphosphate salts having the formula $$M_m N_{4-(m+n)} H_n P_2 O_8$$

where M and N are cations which are selected from the group consisting of sodium, potassium, lithium and ammonium, but where M and N are different cations from the above class, and where $m$ is an integer of 1 to 3 and $n$ is an integer of 0 or 2.

2. The peroxydiphosphate salts of claim 1 wherein M is sodium and N is potassium.

3. The peroxydiphosphate salts of claim 1 wherein M is sodium and N is ammonium.

4. The peroxydiphosphate salts of claim 1 wherein M is potassium and N is ammonium.

References Cited

Simon et al.: Chem. Abstracts, vol. 54, p. 8389$h$ (1960).

Van Wazer: Phosphorous and Its Compounds, pp. 821–823, vol. 1, Chemistry (Interscience 1958).

OSCAR R. VERTIZ, Primary Examiner

C. B. RODMAN, Assistant Examiner

U.S. Cl. X.R.

23—107